United States Patent [19]
Winnike et al.

[11] Patent Number: 5,263,685
[45] Date of Patent: Nov. 23, 1993

[54] VALVE SEAT

[75] Inventors: Don Winnike, Benton; Filiberto R. Jimenez, Cabot, both of Ark.

[73] Assignee: Orbit Valve Company, Little Rock, Ark.

[21] Appl. No.: 912,340

[22] Filed: Jul. 13, 1992

[51] Int. Cl.$^5$ .................... F16K 5/06; F16K 5/20
[52] U.S. Cl. ................... 251/316; 251/315 R; 251/333; 251/163
[58] Field of Search ............... 251/315, 316, 163, 333

[56] References Cited

U.S. PATENT DOCUMENTS

| | | | |
|---|---|---|---|
| 2,076,840 | 4/1937 | Heggem . | |
| 2,076,841 | 4/1937 | Heggem . | |
| 2,516,947 | 8/1950 | Blevans . | |
| 2,719,022 | 9/1955 | Blevans . | |
| 3,515,371 | 6/1970 | King et al. . | |
| 4,280,522 | 7/1981 | Pechnyo et al. | 251/315 X |
| 4,601,308 | 7/1986 | Stone et al. | 251/316 X |

FOREIGN PATENT DOCUMENTS 2531942  1/1977  Fed. Rep. of Germany ...... 251/315

OTHER PUBLICATIONS

Xomox Corp. Impact Valve News, Jun./Jul., 1990 issue, p. 2.
Jamesbury Bulletin 244 entitled: "Metal Seated Wafer-Sphere Butterfly Valves".
Jamesbury brochure entitled: "Series 8500 14"-36" Wafer-Sphere Valves".
Fisher Controls brochure entitled: "150 lb. Vee-Ball Construction Features".
Fisher Controls brochure entitled: "Control Valves Eccentric-Disc Valve Body Assemblies".

*Primary Examiner*—Arnold Rosenthal
*Attorney, Agent, or Firm*—Hill, Steadman & Simpson

[57] ABSTRACT

A valve seat arrangement sealing against a valve core in a valve, particularly for a ball valve, having an inner ring with a first deflectable sealing lip and an outer ring with a second deflectable sealing lip. The first deflectable lip is arranged to protrude forwardly to make initial contact with a closing valve core and once deflected, the second lip is arranged to land against said closing valve core forming a secondary seal. The first sealing lip and the second sealing lip are fashioned having selectively angled beveled surfaces facing the core. The invention provides an effective sealing arrangement for high temperature service.

22 Claims, 2 Drawing Sheets

VALVE SEAT

BACKGROUND OF THE INVENTION

This invention relates to a valve seat for a valve closure element for control of fluid flow within a valve. In particular, this invention relates to a valve seat effective over a wide temperature range which has a ring-type seal assembly compressibly closed by pressing of a ball valve.

A tubular-type sealing ring is disclosed in U.S. Pat. No. 3,515,371. In this patent a valve is described similar in operation to U.S. Pat. Nos. 2,076,840, 2,076,841, 2,516,947 and 2,719,022. In operation, such valves have a valve core which is caused to axially rotate from a full open position to a position wherein a solid portion of the valve core is positioned opposite a valve seat with subsequent pivotal movement of the core causing seating engagement with the seat. In U.S. Pat. No. 3,515,371, this movement is caused by the synchronized rotative movement and axial movement of the valve stem cooperatively with the valve core.

In U.S. Pat. No. 3,515,371 a valve seat is described having an inner ring having a recessed portion at one end thereof about which a circular length of stainless steel tubing is positioned. An outer ring is adapted to abut against the tubing insert when assembled. The assembly is press fit between the inner ring and the outer ring, the assembly being such that the front surface of each are flush prior to machining. After machining, a seating face is created, including upper and lower lip portions respectively which act as a secondary seating surface for the valve core, supplementing the surface of the exposed tubing insert.

SUMMARY OF THE INVENTION

It is an object of the present invention to provide a high temperature valve seat which increases flexibility of the seat sealing surface to function over a wider temperature range, which compensates for greater thermal expansion/contraction in the valve operating mechanism. It is an object of the present invention to provide a high temperature valve seat which has improved operation because the seat consists of fewer components which are more tolerant of machining and manufacturing variations. It is an object of the present invention to provide a ball valve having a rotating and tilting ball valve core (ball) which effectively seats with an improved sealing surface to shut off the valve in demanding services.

These and other objects are inventively achieved in that a sealing surface for a valve is provided which comprises two parts, an outer ring and an inner ring. The inner ring and outer ring are machined from corrosion-resistant materials such as various grades of stainless steel, nickel alloys, etc. The two seat rings are constructed such that a small gap exists between the seat sealing lips. The gap affords independent flexure of the sealing members, yet is small enough to exclude ingress of line debris.

In service, a seal is established between the valve core, such as a ball, and seat when the core is brought into contact with the seat. The core makes initial contact with the inner seat lip. As the core is forced further into the valve seat, the inner seat ring lip deflects so that the core also contacts the outer seating lip which in turn provides a secondary sealing member. The outer seat lip is constructed such that after a predetermined amount of flexure takes place, any additional effort to force the core against the seat results in a tighter seal with virtually no additional seat deflection.

BRIEF DESCRIPTION OF THE DRAWINGS

FIG. 3 is a front elevational view of the valve seat of the present invention; and FIG. 4 is an enlarged partial sectional view of a valve ball and seat taken from FIG. 1.

DETAILED DESCRIPTION OF THE PREFERRED EMBODIMENTS

Figure 1:
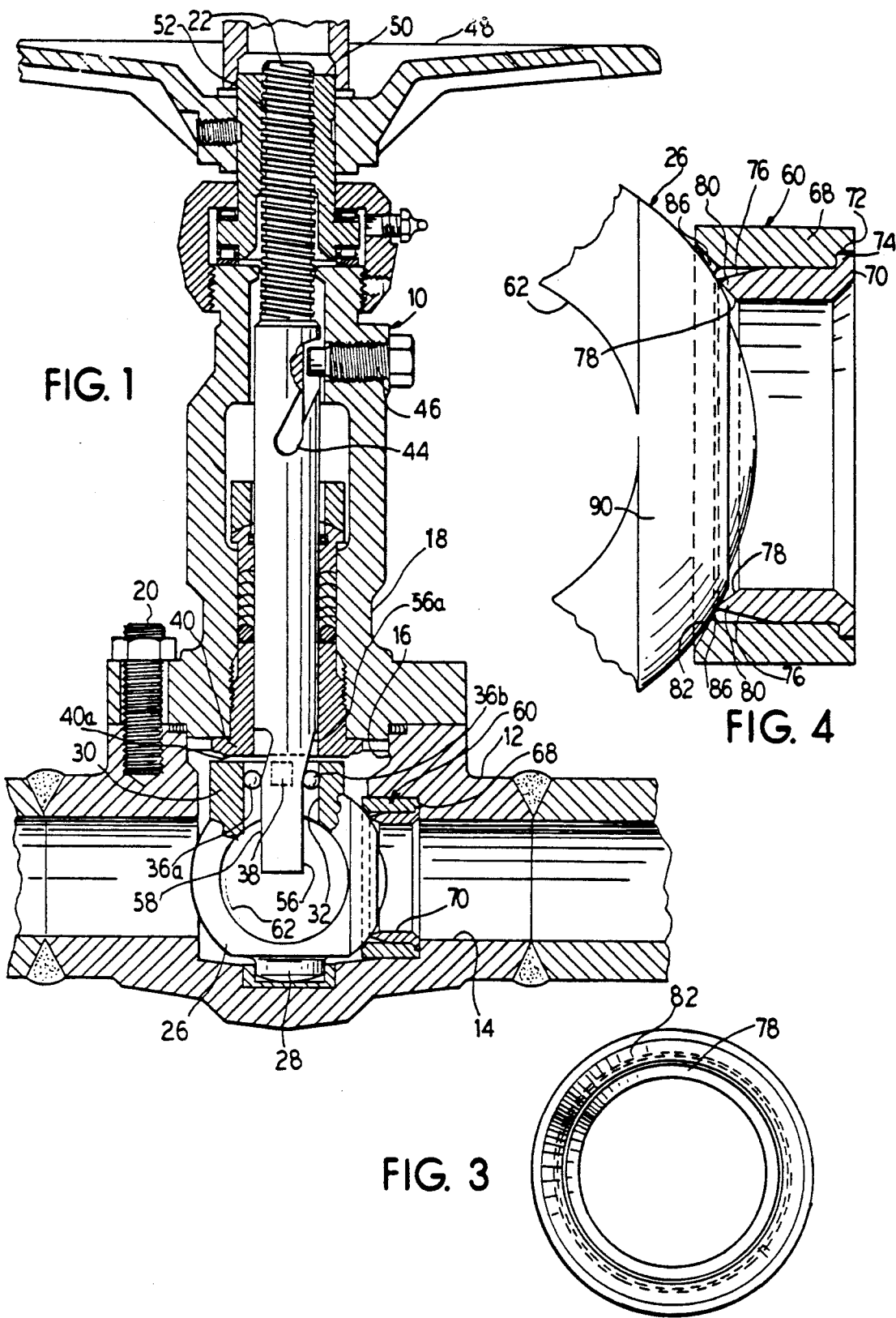
FIG. 1 is a sectional view of a valve incorporating a valve seat of the present invention.

FIG. 1 shows a valve 10, the operation of which is generally disclosed in U.S. Pat. No. 3,515,371 incorporated by reference. The valve 10 has a valve body 12 having an axial bore 14, an open top 16 is covered by a valve bonnet 18 by a plurality of studs 20. Disposed axially through the valve bonnet and extending down into the valve body is a valve stem 22. Located within the body 16 is a valve core such as a ball 26. The ball provides a trunnion 28 on a bottom end thereof, and a neck 30 on a top end thereof. The neck 30 provides a top aperture 32 having pin bearings 36a, 36b disposed on opposite lateral sides thereof. Two support pins 38 (one shown) are provided extending upwardly from the neck 30 and facing a bottom surface 40a of a bushing 40 located within the bonnet 18. A small clearance is provided between the bottom surface 40a and the support pins 38.

The stem 22 provides a spiral slot 44 on an outside surface thereof into which is fit a stem guide 46 which is threaded into and through the bonnet 18. The spiral slot 44, as described more particularly in the aforementioned reference, allows the stem to be selectively moved axially and rotationally to accomplish the desired sequence. A handle 48 is locked to a threaded bushing 50 at a top end of the valve 10. The valve stem 22 provides a threaded top portion 52 engaged to the threaded bushing. By turning the handle the threaded portion 52 is drawn either upward or forced downward with respect to the bonnet 18.

At a bottom of the stem 22 the otherwise cylindrical perimeter of the stem is formed to have opposed flat surfaces 56, 58. In a closing orientation as shown in FIG. 1 the flat side 56 is closest to a seal assembly 60. As shown in FIG. 1, a cylindrical fluid through passage 62 formed through the ball 26 is turned 90° away from the seal assembly 60. Further downward translation of the stem 22 from the position of FIG. 1 will force an offset surface portion 56a of the stem surface 56 against the lateral pin 36b which will thrust the neck 30 of the ball 26 toward the seal assembly 60 in a pivoting motion about trunnion 28. This completes a tilting motion of the ball to compress the ball 26 against the seal assembly 60. As shown in FIG. 1, the seal assembly 60 provides an outer ring 68 surrounding an inner ring 70.

Figure 2:
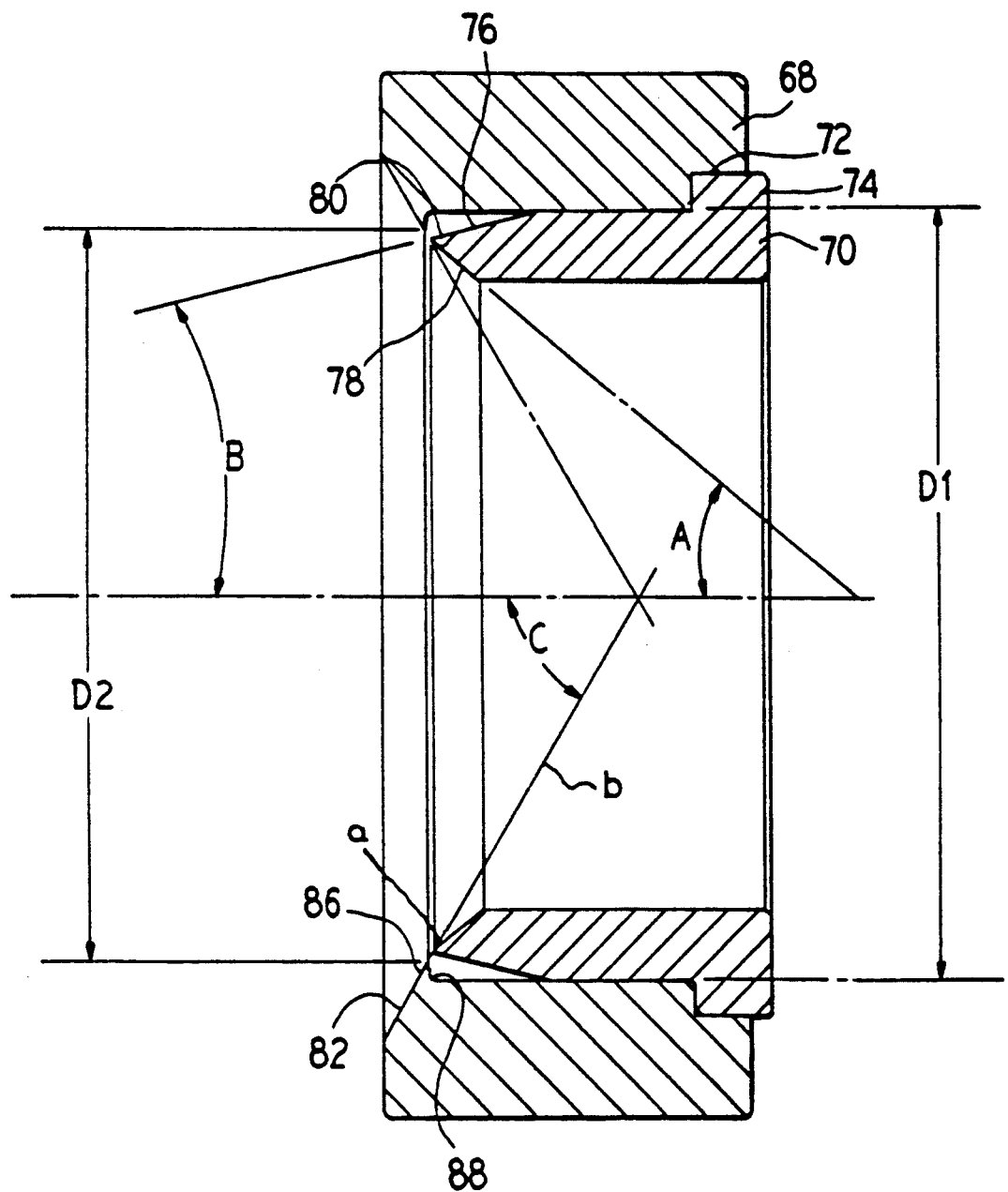
FIG. 2 is an enlarged sectional view of the valve seat of FIG. 1.

FIGS. 2 and 3 show in enlarged scales the seal assembly 60. The outer ring 68 provides at a back end thereof a ledge seat 72. The inner ring 70 provides an annular flange 74 which interfits tightly within the seat 7 for holding the outer ring and the inner ring together. The flange 74 provides a stop so that the seal assembly 60 can be pulled from the valve body 12 for maintenance or replacement. The inner ring 70 and the outer ring 68 can be held together by a press fit everywhere they touch. The flange 74 may have a clearance or a press fit depending on how the parts are machined within their tolerance.

The inner ring 70 provides at a front end thereof a peripheral outside bevel 76 and a peripheral inside bevel 78 forming a pointed sealing lip 80. The inside bevel 78 is cut at a sharper angle with respect to a central axis of the inner ring 70 than the outside bevel 76. In the presently preferred embodiment, the inside bevel is cut to angle A, approximately 40° to the central axis and the outside bevel angle B is cut to approximately 13° 30'±0° 15' to the central axis. The outer ring 68 provides at a front side thereof an inward bevel 82 somewhat sharper than the inside bevel 78 of the inside ring 70. In the presently preferred embodiment the inward bevel 82 is cut at angle C, approximately 60°±2° to a central axis of the outer ring. Additionally, on an inside of the outside ring 68, an inside diameter D1 of the outer ring 68 departs at a front portion thereof to a lesser diameter D2 creating a ledge 88. The departure creates an annular, inwardly directed lip 86. In the presently preferred embodiment, the lesser diameter D2 is approximately 95% of the inside diameter D1.

The ball 26 provides a sealing surface 90 covering a surface area of the ball 26 which engages the sealing assembly 60 (FIGS. 1 and 4).

As shown in FIG. 2, in the presently preferred embodiment, the inner ring 70 proceeds forwardly to at least intersect at a tip a, an imaginary cone b defined by the inside bevel 82 of the outer ring. Because of this, in operation, the sealing surface 90, when the ball 26 is forced into a closed position, makes first contact with the sealing lip 80. As the ball is pivoted closed, the sealing lip 80 deflects outwardly toward the outer ring 68, i.e., the sealing lip 80 is opened up. As the sealing lip 80 is deflected, the ball then makes contact with the inwardly directed lip 86 of the outer ring 68 which provides a secondary sealing member. The inwardly directed lip 86 deflects to a point, but is sufficiently stiff such that after optimal flexure takes place, any additional effort to force the core against the seating assembly 60 results in a tighter seal with virtually no additional deflection of the inwardly directed lip 86.

In the preferred embodiment, the seat assembly 60 is manufactured from corrosion-resistant materials such as various grades of stainless steel, nickel alloys, etc.

Although the present invention has been described with reference to a specific embodiment, those of skill in the art will recognize that changes may be made thereto without departing from the scope and spirit of the invention as set forth in the appended claims.

I claim as my invention:

1. A valve seat assembly for engagement with a spherical surface segment of a core element of a valve, comprising:

an outer ring having a beveled annular surface defining a segment of an imaginary cone;

an inner ring having a deflectable first annular lip arranged to be facing said core element and defining a flow passage through said inner ring, said inner ring disposed coaxially inside said outer ring, said annular lip arranged protruding into said imaginary cone, such that a closing of said core element deflects said annular lip before making contact with said beveled annular surface, said annular lip deflectable outwardly allowing said closing valve core to abut said annular surface.

2. The valve seat according to claim 1, wherein said first annular lip is formed by a first bevel on an inside front edge of said inner ring and a second bevel on an outside front edge of said inner ring.

3. The valve seat according to claim 1, wherein said outer ring provides an inwardly directed second annular lip, said second annular lip being deflected secondarily in sequence from said first annular lip during closure of said core element.

4. The seat according to claim 1, wherein said first annular lip comprises an inside bevel inclined at a first angle relative to an axis of said inner ring, and said beveled annular surface of said outer ring is inclined at a second angle relative to said axis of said outer ring, said first angle flatter than said second angle.

5. The valve seat according to claim 4, wherein said first angle is approximately 40° and said second angle is approximately 60°.

6. The valve seat according to claim 5, wherein said first annular lip comprises an outside bevel inclined at a third angle relative to said axis of said inner ring and said third angle is approximately 13.5°.

7. The seat according to claim 1, wherein said first annular lip of said inner ring comprises an inside bevel inclined at a first angle to a central axis of said inner ring and an outside bevel having a second angle with respect to said axis of said inner ring, said second angle flatter than said first angle.

8. The seat according to claim 7, wherein said first angle is approximately 40° and said second angle is approximately 13.5°.

9. The seat according to claim 1, wherein said outer ring provides an inwardly directed second annular lip defined between said beveled annular surface and a ledge formed in an inside diameter of said inner ring.

10. The seat according to claim 1, wherein said inner ring provides a perimeter flange on a backside thereof, and said outside ring provides a peripheral seat on a backside thereof, said flange interfitting in said seat when said inner ring is assembled coaxially with said outer ring.

11. A ball valve comprising:

a valve housing having an axial flow passage;

a ball having a flow passage therethrough alignable with said axial flow passage, said ball located within said housing;

a valve seat having an inner ring with an annular seal lip facing said ball and an outer ring therearound having an annular sealing surface facing said ball, said annular seal lip having an inside beveled surface inclined at a flatter angle than said annular sealing surface, said valve seat mounted in said valve housing surrounding said axial flow passage;

means for thrusting said ball against said sealing assembly for closing said axial flow passage.

12. The ball valve according to claim 11, wherein said annular sealing surface is beveled at an angle forming a surface section of a cone and said annular seal lip is arranged protruding into said cone.

13. The ball valve according to claim 11, wherein said annular sealing surface is disposed on an inwardly projecting second annular seal lip.

14. The ball valve according to claim 13, wherein said second annular seal lip is defined by said annular sealing surface and by an annular ledge surface which proceeds approximately perpendicularly from an inside diameter of said inner ring.

15. The ball valve according to claim 11, wherein said outer ring has a stepped back end portion, and said inner ring has a flange portion at a back end thereof to be interfit into said stepped back end portion, and said outer ring and said inner ring are press fit into said valve housing.

16. A valve seat assembly for engagement with an annular surface segment of a core element of a valve, consisting essentially of:
   an outer ring providing an inwardly radially projecting annular seal lip;
   an inner ring held coaxially within said outer ring, providing a tapered seal lip, tapered in an axial direction of the inner ring an empty volume arranged between said tapered seal lip and said annular seal lip;
   said tapered seal lip freely deflectable outwardly toward said radially projecting annular seal lip upon engagement with said core element of the valve.

17. The valve seat assembly according to claim 16, wherein said radially projecting annular seal lip provides a first surface facing said core element beveled at a first angle inclined to said axis of said inner ring.

18. A valve seat assembly for engagement with an annular surface segment of a core element of a valve, comprising:
   an outer ring providing an inwardly radially projecting annular seal lip;
   an inner ring held coaxially within said outer ring, providing a tapered seal lip, tapered in an axial direction of the inner ring; and
   wherein said tapered seal lip comprises an inside bevel inclined at a first angle relative to an axis of said inner ring, and an outside bevel inclined at a second angle relative to said axis of said inner ring, said second angle arranged flatter than said first angle.

19. The valve seat assembly according to claim 18, wherein said first angle is approximately 40° and said second angle is approximately 13.5°.

20. The valve seat assembly according to claim 16, wherein said radially projecting annular lip is defined at a front surface by a beveled annular surface inclined to said axis of said inner ring, and a backside surface arranged approximately perpendicular to said axis of said inner ring.

21. A valve seat assembly for engagement with an annular surface segment of a core element of a valve, comprising:
   an outer ring providing an inwardly radially projecting annular seal lip;
   an inner ring held coaxially within said outer ring, providing a tapered seal lip, tapered in an axial direction of the inner ring and defining a free volume between said tapered seal lip and said annular seal lip;
   said tapered seal lip freely deflectable outwardly toward said radially projecting annular seal lip upon engagement with said core element of the valve; and
   wherein said radially projecting annular lip is defined at a front surface by a beveled annular surface inclined at a first angle to said axis of said inner ring, and said tapered seal lip comprises an inside bevel defining an annular surface inclined at a second angle to said axis of said inner ring, said second angle smaller than said first angle.

22. The valve seat assembly according to claim 21, wherein said tapered seal lip comprises an outside bevel defining an annular surface inclined at a third angle to said axis of said inner ring.

* * * * *